(12) United States Patent
Chen

(10) Patent No.: US 7,131,711 B2
(45) Date of Patent: Nov. 7, 2006

(54) COMPUTER ENCLOSURE INCORPORATING BEZEL PIVOTING MECHANISM

(75) Inventor: Li Ping Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 517 days.

(21) Appl. No.: 10/365,830

(22) Filed: Feb. 12, 2003

(65) Prior Publication Data

US 2004/0160149 A1 Aug. 19, 2004

(51) Int. Cl.
*A47B 97/00* (2006.01)

(52) U.S. Cl. .................. 312/223.2; 361/724
(58) Field of Classification Search ............ 312/223.1, 312/223.2; 361/724
See application file for complete search history.

(56) References Cited

U.S. PATENT DOCUMENTS 5,926,916 A * 7/1999 Lee et al. ............... 361/724 X
6,130,822 A * 10/2000 Della Fiora et al. ........ 361/724
6,288,333 B1 * 9/2001 Liu et al. ................. 312/223.2

* cited by examiner

*Primary Examiner*—Anthony D. Barfield
(74) *Attorney, Agent, or Firm*—Wei Te Chung

(57) ABSTRACT

A computer enclosure includes a cage (40), a bezel (60), and two pivot devices (80). The cage has a front panel (43) defining two holes (422). Each pivot device (80) is fixed to the bezel, and includes a cylinder (13), a spring (20) and a pivot (30). The cylinder receives the spring therein. Two L-shaped apertures (131) are defined in opposite sides of the cylinder. Each pivot includes a central pin (31), and a circumferential wall (32) surrounding most of the pin. Two resilient L-shaped hooks (324) are formed at opposite sides of the circumferential wall. The spring is compressed between a top end of the cylinder and the circumferential wall. When the hooks are slid from horizontal portions (132) of the apertures to vertical portions (133) of the apertures, the spring pushes the pivot downwardly, and the pin is pivotably engaged in a corresponding hole of the front panel.

18 Claims, 4 Drawing Sheets

COMPUTER ENCLOSURE INCORPORATING BEZEL PIVOTING MECHANISM

BACKGROUND OF THE INVENTION

1. Field of the Invention

The present invention relates to computer enclosures, and more particularly to a mechanism for attaching a bezel to a computer enclosure.

2. Description of the Related Art

A conventional computer enclosure comprises a cage and a bezel. The bezel is attached to the cage with screws. It is inconvenient for a user to attach and remove the bezel by manipulating the screws. Furthermore, in assembly of such computer enclosure on a factory production line, manual insertion and removal of screws is slow, laborious and inefficient. To address the above problems, Taiwan Patent No. 506565 discloses a computer enclosure that incorporates a pivoting mechanism connecting a bezel with a cage of the computer enclosure. A pair of screws is provided to pivotably secure the bezel to the cage. The bezel is rotated about the screws. However, this computer enclosure still requires the use of screws.

SUMMARY OF THE INVENTION

Accordingly, an object of the present invention is to provide a computer enclosure incorporating a bezel pivoting mechanism which facilitates easy attachment of a bezel to the enclosure.

To achieve the above object, a computer enclosure in accordance with the present invention comprises a cage, a bezel and a pair of pivot devices. The cage has a front panel defining a pair of openings and a corresponding pair of through holes therein. Each pivot device is fixedly engaged with the bezel, and comprises a cylinder, a spring and a pivot. The cylinder receives the spring therein. A pair of L-shaped apertures is defined in opposite sides of the cylinder. Each pivot comprises a central pin, and a circumferential wall integrally extending from and surrounding most of the pin. A pair of resilient L-shaped hooks is outwardly formed at respective opposite sides of the circumferential wall. The hooks are deformably received in vertical portions of the apertures, slid up the vertical portions, and rotatingly received in horizontal portions of the apertures. The spring is compressed between a top end of the cylinder and the circumferential wall of the pin. Each pivot device is then extended through a corresponding opening of the front panel. The hooks are rotated out of the horizontal portions, the spring rebounds and pushes the pivot downwardly, and the pin is pivotably engaged in a corresponding through hole of the front panel. The bezel is thus pivotably attached to the cage by the pivot devices.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
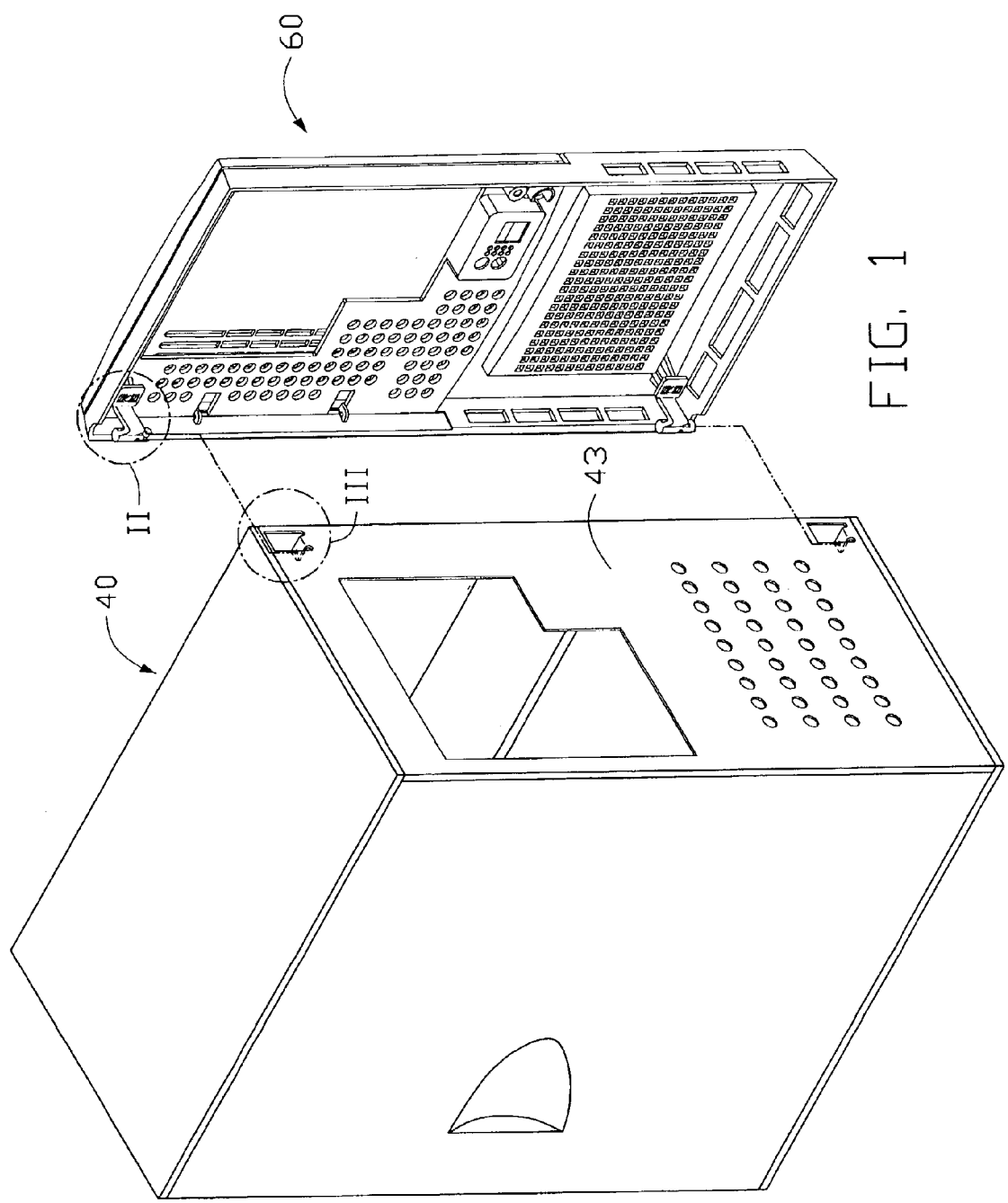
FIG. 1 is an exploded, isometric view of a computer enclosure in accordance with a preferred embodiment of the present invention, the computer enclosure comprising a cage, a bezel and a pair of pivot devices.
Figure 2:
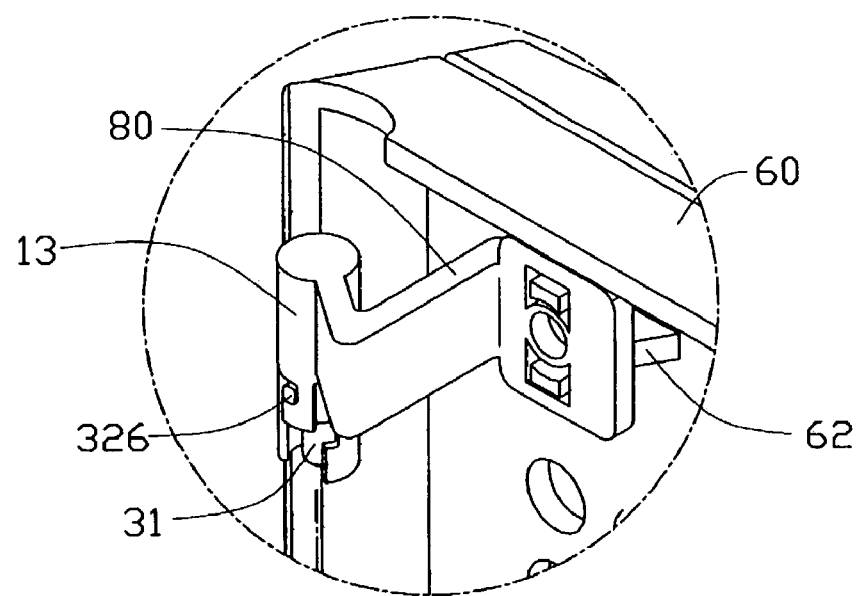
FIG. 2 is an enlarged view of a circled portion II of FIG. 1, partly cut away for better illustration.
Figure 3:
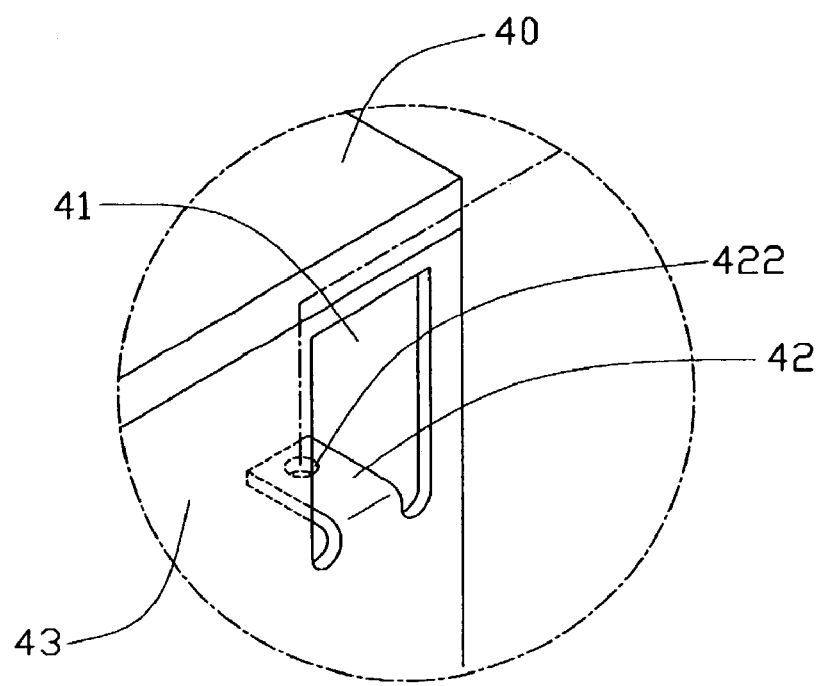
FIG. 3 is an enlarged view of a circled portion III of FIG. 1.

Referring to FIGS. 1 through 3, a computer enclosure in accordance with a preferred embodiment of the present invention comprises a cage 40 and a bezel 60. A pair of pivot devices 80 pivotably attaches the bezel 60 to the cage 40. A pair of vertically spaced bent plates 42 is bent inwardly from one side of a front panel 43 of the cage 40. A pair of openings 41 is thus defined in the front panel 43. A through hole 422 is defined in each bent plate 42. A pair of vertically spaced fixing pedestals 62 is formed at one side of an inside face of the bezel 60, generally corresponding in position to the openings 41 of the front panel 43.

Figure 4:
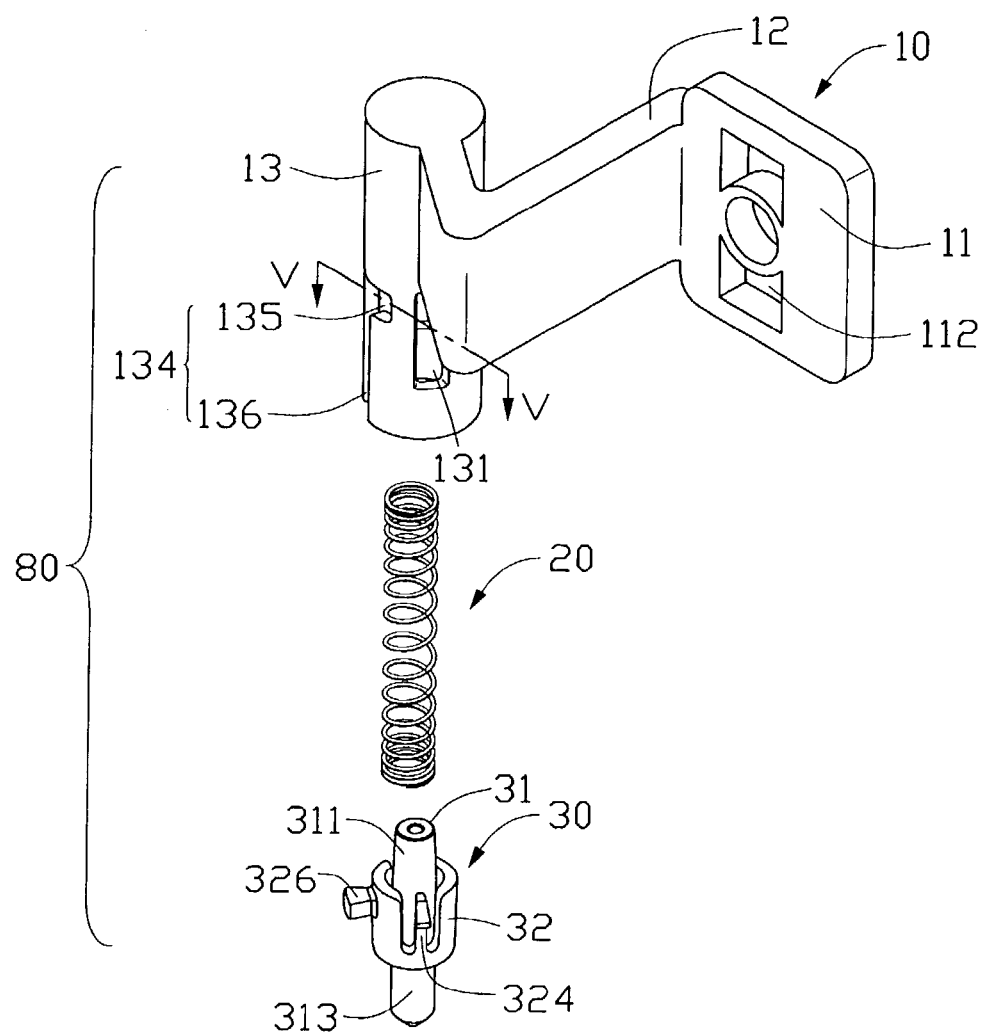
FIG. 4 is an enlarged, exploded isometric view of one of the pivot devices of FIG. 1, the pivot device comprising a base portion, a spring and a pivot.
Figure 5:
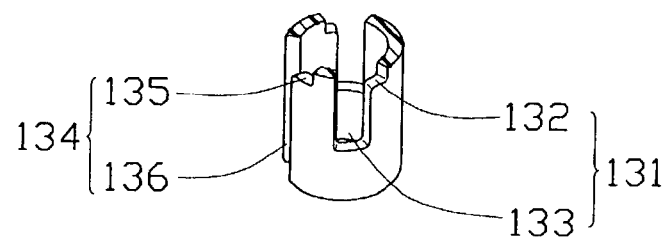
FIG. 5 is an isometric view of part of the base portion of FIG. 4, the base portion being cut away at line V—V of FIG. 4.
Figure 6:
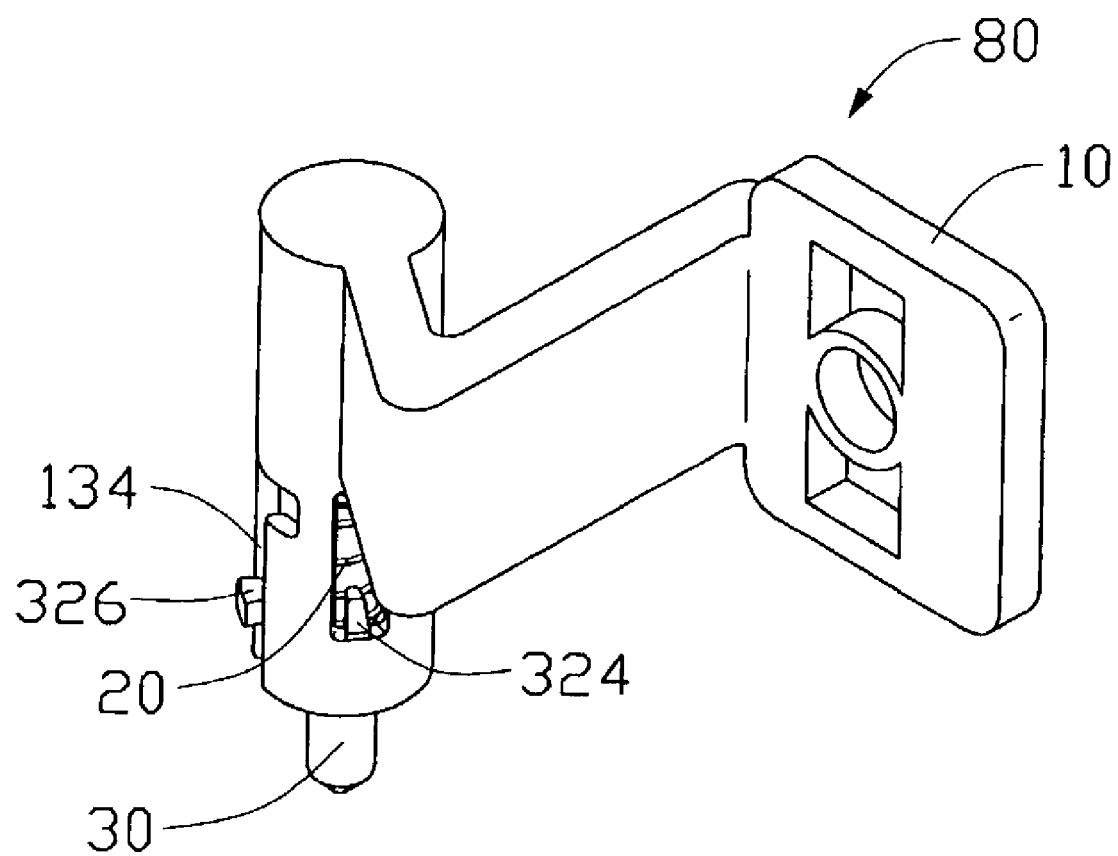
FIG. 6 is an assembled view of FIG. 4.

Referring also to FIGS. 4 through 6, each pivot device 80 comprises a base portion 10, a coil spring 20 and a pivot 30. The base portion 10 comprises a fixing part 11, a hollow cylinder 13, and a connecting arm 12 integrally interconnecting the fixing part 11 and the cylinder 13. A pair of holes 112 is defined in the fixing part 11, for fixedly receiving a corresponding fixing pedestal 62 of the bezel 60. A top end of the cylinder 13 is closed off, and a bottom end of the cylinder 13 is open. A pair of L-shaped first apertures 131 is defined in respective opposite sides of the cylinder 13 below the connecting arm 12. Each first aperture 131 comprises a horizontal portion 132 and a vertical portion 133. An L-shaped second aperture 134 is defined between the first apertures 131. The second aperture 134 comprises a horizontal portion 135 and a vertical portion 136. The vertical portion 136 communicates with an exterior of the cylinder 13 at a bottom extremity of the cylinder 13.

The pivot 30 comprises a central pin 31. The pin 31 comprises an upper tapered portion 311 and a lower cylindrical portion 313. A circumferential wall 32 integrally extends from and surrounds most of the tapered portion 311 except an upper part thereof. A generally cylindrical space is defined between the tapered portion 311 and the circumferential wall 32, for receiving an end of the spring 20 therein. A pair of resilient L-shaped hooks 324 is outwardly formed at respective opposite sides of the circumferential wall 32, corresponding to the first apertures 131. A guiding protrusion 326 is outwardly formed at the circumferential wall 32 between the hooks 324, corresponding to the second aperture 134.

In assembly of each pivot device 80, a bottom end of the spring 20 is received in the space of the pivot 30, and an opposite top end of the spring 20 is inserted into the cylinder 13. The pivot 30 is pushed upwardly toward the closed end of the cylinder 13, and the spring 20 is compressed. The hooks 324 are progressively compressed toward each other by a bottom end of the cylinder 13 until they are received in the cylinder 13. Referring particularly to FIG. 6, the pivot 30 is continued to be pushed upwardly, with the guiding protrusion 326 sliding in the vertical portion 136 of the second aperture 134 until the hooks 324 rebound and extend into the first apertures 131. The hooks 324 and the guiding protrusion 326 slide upwardly in the respective first and second apertures 131, 134 until they simultaneously reach top ends of the first and second apertures 131, 134. Referring particularly to FIG. 2, the pivot 30 is rotated such that the hooks 324 and the guiding protrusion 326 are received in blind ends of the horizontal portions 132, 135 respectively. The pivot 30 is thus fully accommodated inside the cylinder 13.

Referring particularly to FIG. 1, a pair of pivot devices 80 is attached to the bezel 60, with the fixing pedestals 62 engaging in the holes 112 respectively. The bezel 60 is then attached to the cage 40. The pivot devices 80 are extended through the openings 41 of the cage 40 and supported on the bent plates 42 respectively. The hooks 324 and the guiding protrusion 326 of each pivot device 80 are then rotated out of the respective horizontal portions 132, 135 of the first and second apertures 131, 134. The spring 20 rebounds and pushes the pivot 30 downwardly, and the cylindrical portion 313 is extended through the corresponding through hole 422. The bezel 60 is thus pivotably attached to the cage 40 by the pivot devices 80. The bezel 60 can be rotated relative to the front panel 43, with the cylindrical portions 313 pivoting in the through holes 422 respectively.

In disassembly of the computer enclosure, each pivot 30 is pushed back into its corresponding cylinder 13. The hooks 324 and the guiding protrusion 326 are engaged in the horizontal portions 132, 135 of the first and second apertures 131, 134 respectively. The bezel 10 is then readily disengaged from the cage 40.

In an alternative embodiment of the computer enclosure of the present invention, the guiding protrusion 326 can be replaced by another hook 324, and the second aperture 134 can be replaced by another first aperture 131 accordingly. In a further alternative embodiment, both the guiding protrusion 326 and the second aperture 134 can be omitted.

While the present invention has been illustrated by the above description of embodiments thereof, and while the embodiments have been described in considerable detail, it is not intended to restrict or in any way limit the scope of the appended claims to such detail. Additional advantages and modifications within the scope and spirit of the present invention will readily appear to those skilled in the art. Therefore, the present invention is not limited to the specific details and illustrative examples shown and described above.

What is claimed is:

1. A computer enclosure, comprising:
    a cage defining a pair of holes therein;
    a bezel having fixing means arranged thereon; and
    a pair of pivot devices pivotably attaching the bezel to the cage, each of the pivot devices comprising:
        a base portion engaged with the fixing means, the base portion comprising a hollow cylinder, an aperture defined in the base portion protusion; and
        a pin movably received in the cylinder and pivotably engaged in a corresponding hole of the cage, a guide protrusion arranged on the pin slidably being received in the aperture;
    wherein the pin is retractable into the cylinder and out from the corresponding hole for facilitating disengagement of the bezel from the cage.

2. The computer enclosure as claimed in claim 1, wherein a pair of spaced bent plates is formed inwardly from one side of a front panel of the cage, and the holes are defined in the bent plates respectively.

3. The computer enclosure as claimed in claim 1, wherein the fixing means comprises a pair of fixing pedestals, and each of the base portions further comprises a fixing part, a plurality of holes being defined in the fixing part receiving a corresponding fixing pedestal therein.

4. The computer enclosure as claimed in claim 1, wherein each of the pivot devices further comprises a spring received in the cylinder, a circumferential wall is arranged around the pin, and a space is defined between the circumferential wall and the pin receiving and end of the spring therein.

5. The computer enclosure as claimed in claim 4, wherein a plurality of resilient hooks is arranged on the circumferential wall, and a plurality of apertures is defined in the cylinder slidably receiving the hooks therein.

6. The computer enclosure as claimed in claim 1, wherein the aperture is L-shaped.

7. The computer enclosure as claimed in claim 1, wherein a connecting arm integrally interconnects the fixing pan and the cylinder.

8. A computer enclosure comprising:
    a cage with an exterior bezel pivotally attached thereto;
        one of said cage and said bezel defining a pivot hole and the other defining a pivot device,
    said pivot device including:
        a hollow holder defining an axial direction, and a pin received therein and moveable along said axial direction and between inner and outer positions,
        a biasing device urging said pin toward the outer position where the pin extends into the pivot hole for holding the bezel in position with regard to the cage and for rotation of said bezel relative to the cage, and
        a restraint device holding said pin in the inner position where the pin is retracted away from the pivot hole for assembling/disassembling said bezel to/from the cage.

9. The enclosure as claimed in claim 8, wherein said biasing device is a coil spring.

10. The enclosure as claimed in claim 8, wherein said restraint device includes a guiding aperture formed in one of the holder and the pin, and a guiding protrusion formed on the other and received in the guiding aperture.

11. The enclosure as claimed in claim 8, wherein the pivot device is located on the bezel, and the pivot hole is located in the cage.

12. The enclosure as claimed in claim 8, wherein said pivot device further includes a hook engaged within an aperture to retain said pin at said outer position.

13. The enclosure as claimed in claim 12, wherein said restraint device includes a guiding aperture formed in one of the holder and the pin, and a guiding protrusion formed on the other and received in the guiding aperture, said aperture and said guiding aperture being located at different radial positions, said guiding protrusion and said hook being located at different radial positions.

14. The enclosure as claimed in claim 10, wherein said guiding aperture is of an L-shaped configuration.

15. A computer enclosure comprising:
    a cage defining a hole therein;
    a bezel having fixing means ranged thereon; and
    a pivot device pivotally attaching the bezel to the cage, the pivot device comprising:
        a base portion engaged with the fixing means, the base portion comprising a hollow holder; and
        a pin movably received in the cylinder and pivotably engaged in the hole of the cage; and a restraint device disposed on one or both of the base portion and the pin, the restraint device holding said pin in an inner position where the pin is retracted away from the pivot hole for assembling/disassembling said bezel to/from the cage.

16. The computer enclosure as claimed in claim 15, wherein said restraint device includes a guiding aperture formed in one of the holder and the pin, and a guiding protrusion formed on the other and received in the guiding aperture.

17. The computer enclosure as claimed in claim 16, wherein said pivot device comprises a hook engaged within an aperture to retain said pin at an outer position.

18. The computer enclosure as claimed in claim 17, wherein said aperture of said pivot device and said guiding aperture are located at different radial positions, said guiding protrusion and said hook are located at different radial positions.

* * * * *